Patented Apr. 20, 1948

2,440,100

UNITED STATES PATENT OFFICE 2,440,100

SOLVENT FOR DEGREASING IRON AND ALUMINUM

Walter Klabunde, Niagara Falls, N. Y., assignor to E. I. du Pont de Nemours & Company, Wilmington, Del., a corporation of Delaware No Drawing. Application August 24, 1945, Serial No. 612,553

4 Claims. (Cl. 252—172)

This invention relates to the prevention of trichlorethylene decomposition as catalyzed by the presence of aluminum or iron, particularly as is encountered in the metal vapor degreasing.

It is known that trichlorethylene when exposed to air, light, and heat decomposes by oxidation with the formation of dichloracetyl chloride, hydrochloric acid, and phosgene. Several types of stabilizers are commonly used to inhibit the decomposition of trichlorethylene by oxidation. However, in metal degreasing, where the solvent often is subjected to higher temperatures, trichlorethylene can undergo a condensation type decomposition to form hydrochloric acid, together with a resinous material. In the presence of aluminum or iron the hydrochloric acid formed by either type decomposition reacts with these metals to form the chloride salts which act as catalysts for the condensation reaction. Thus, when the condensation reaction takes place in a metal degreaser, where the chips of these metals are often heaped in the boiling solvent, it often becomes autocatalytic, i. e., where aluminum is present the hydrochloric acid forms aluminum chloride which decomposes more trichlorethylene to form more catalyst. When this occurs, the solvent decomposes very vigorously with the evolution of large quantities of hydrochloric acid and the formation of a tarry or gummy mass in the solvent.

Efforts have been made in the past to combat this type of decomposition of the trichlorethylene by the addition of water to the solvent. This practice has only been partially successful, primarily due to the low solubility of water in trichlorethylene. Certain alcohols have also been used in this connection. However, the addition of alcohols increases the solubility of hydrochloric acid in trichlorethylene and this is undesirable in metal degreasing because of corrosion difficulties encountered.

The object of the present invention is to provide a stabilizer for trichlorethylene which will inhibit the condensation type of decomposition which is catalyzed by the presence of aluminum or iron. Another object of this invention is to provide a condensation inhibitor for trichlorethylene which is neutral to the solvent and can be readily recovered with the solvent and need only be present in relatively small concentration. A further object is to degrease iron and aluminum articles with chemically stable trichlorethylene. Still other objects will be apparent from the ensuing description.

This present invention is based on my discovery that certain unsaturated organic compounds inhibit the decomposition of trichlorethylene exposed to higher temperatures and which is catalyzed by the presence of aluminum or iron. Although a number of unsaturated organic compounds are compatible with trichlorethylene, only a few have been found which effectively act as trichlorethylene condensation inhibitors.

In particular I have found certain thiophenes; namely, thiophene, 2-methyl thiophene, and 3-methyl thiophene, to be very effective inhibitors of the condensation decomposition of trichlorethylene as catalyzed by the presence of aluminum or iron. In general I prefer to utilize thiophene for this purpose. Thiophene is readily soluble in trichlorethylene. This compound, which has its boiling point at 84° C., is readily recovered with trichlorethylene when the latter is distilled. Furthermore, this material is unaffected by any of the decomposition products of trichlorethylene, and it does not increase the solubility of hydrochloric acid in the solvent.

Excellent results are obtained by adding about 0.02 to 1 per cent by weight of thiophene or methyl thiophene to the trichlorethylene. In most cases a concentration of about 0.1 per cent is preferred. Generally the solvent is used under conditions where decomposition by oxidation can also occur, and for this reason an antioxidant may also be incorporated in the solvent for optimum results.

I have demonstrated the stabilizing effect of thiophene by the following test. Separate portions of trichlorethylene were stored in the absence of air in closed glass containers under identical storage time and conditions. Certain portions, as shown by the following table, contained 0.04 g. per 100 cc. of hydrogen reduced iron powder (about 200 mesh size) and 0.2 g. per 100 cc. of 40 mesh size aluminum powder, respectively, with and without the addition of 0.1 per cent by weight of thiophene, one portion consisted of trichlorethylene with added thiophene and one portion consisted of the trichlorethylene alone. At the end of the storage period, the samples were analyzed for chloride ion, thereby to determine the degree of decomposition which occurred. The following results were obtained:

| Trichlorethylene Portion | Substances Added | Chloride Content (mg./100 cc.) |
|---|---|---|
| 1 | None | 4 |
| 2 | Iron | 1,000 |
| 3 | Iron and thiophene | 35 |
| 4 | Aluminum | 600 |
| 5 | Aluminum and thiophene | 17 |
| 6 | Thiophene | 2.5 |

In the practice of this invention many and various embodiments thereof may be employed. For instance the trichlorethylene, in addition to the thiophene, may also contain one of the known stabilizers against the oxidation decomposition reactions.

While trichlorethylene stabilized by the addition of thiophene or methyl thiophene is well suited for the various uses of this chlorohydrocarbon solvent, the present invention is especially useful in metal degreasing operations, wherein iron or aluminum articles are washed with trichlorethylene to remove oil and grease, particularly after machining operations. The various known metal degreasing processes and apparatus may be used for this purpose in which the solvent temperature may vary from room temperature to the boiling point. The stabilized trichlorethylene may be applied to the metal articles, for example, by dipping, spraying, or condensation of vapor on the articles.

I claim:

1. A liquid solvent composition for degreasing iron and aluminum consisting essentially of trichlorethylene and 0.02 to 1% by weight of an inhibitor for condensation reactions of trichlorethylene catalyzed by the aforesaid metals, said inhibitor being a thiophene selected from the group consisting of thiophene, 2-methyl thiophene and 3-methyl thiophene.

2. The composition of claim 1, wherein said inhibitor is thiophene.

3. The composition of claim 1, wherein said inhibitor is 2-methyl thiophene.

4. The composition of claim 1, wherein said inhibitor is 3-methyl thiophene.

WALTER KLABUNDE.

REFERENCES CITED

The following references are of record in the file of this patent:

UNITED STATES PATENTS

| Number | Name | Date |
|---|---|---|
| 2,212,761 | Webster | Aug. 27, 1940 |
| 2,371,646 | Petering et al. | Mar. 20, 1945 |

FOREIGN PATENTS

| Number | Country | Date |
|---|---|---|
| 160,416 | Switzerland | May 1, 1933 |

OTHER REFERENCES

Chemical Formulary, Bennett, vol 4 (1939), page 497.

Textbook of Organic Chemistry, Wertheim, 2d ed., 1945, page 641.